Feb. 19, 1924.
H. C. RICKETTS
1,484,562
APPARATUS FOR TREATING FRUIT AND THE LIKE
Filed Feb. 23, 1922   2 Sheets-Sheet 1
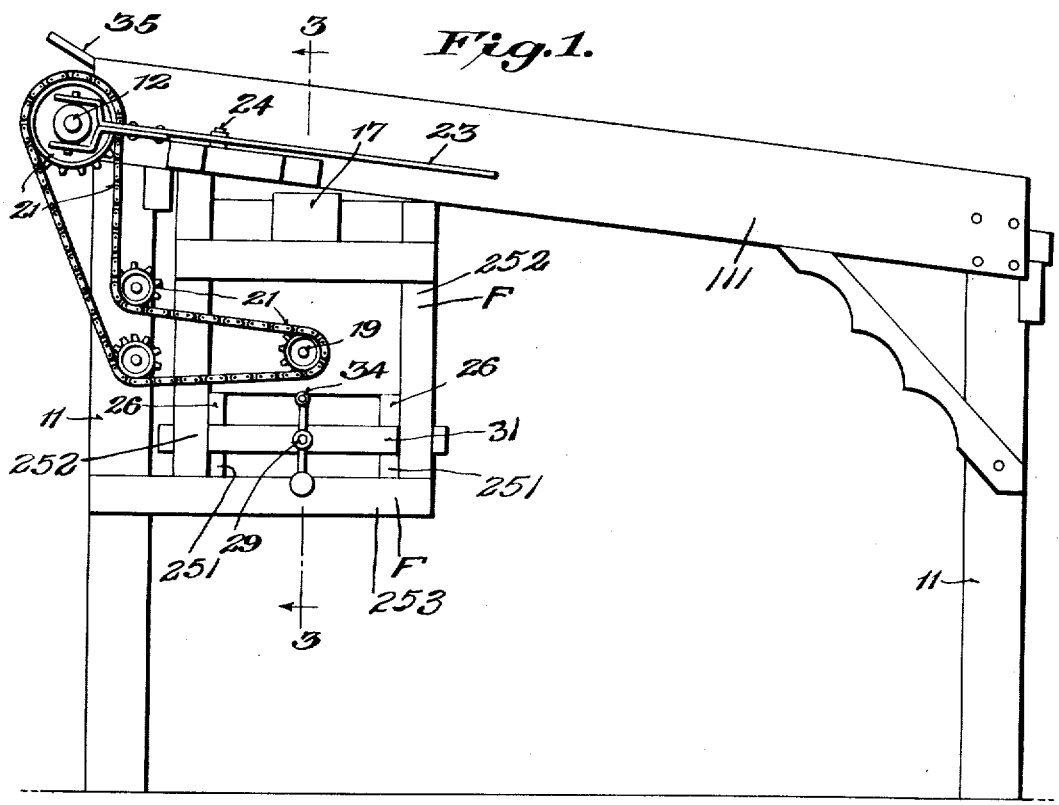
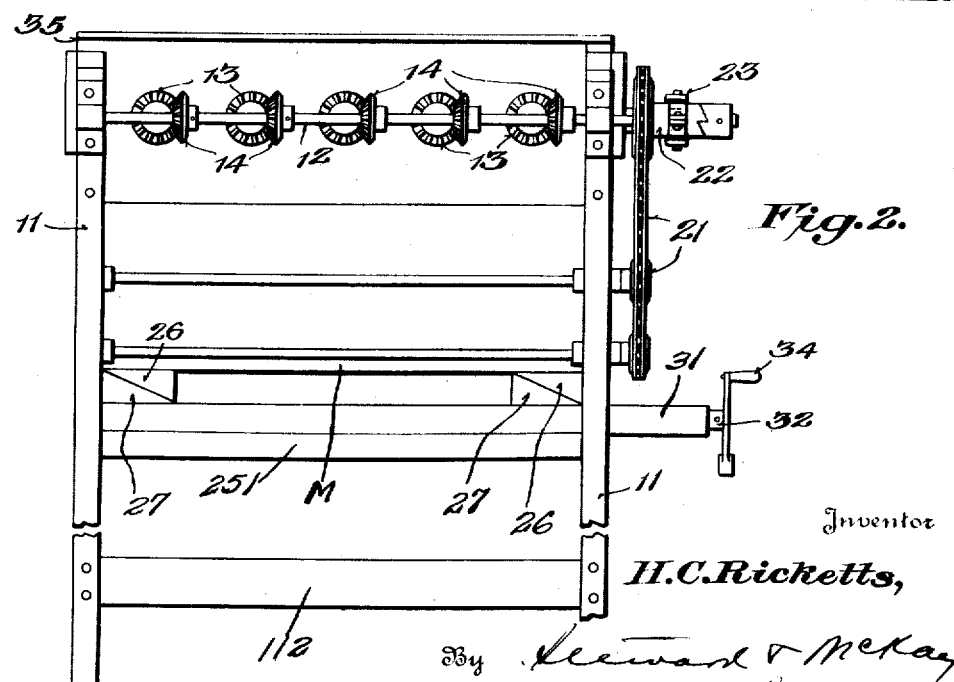
Inventor
H. C. Ricketts,
By Seward & McKay
his Attorneys Feb. 19, 1924. 1,484,562
H. C. RICKETTS
APPARATUS FOR TREATING FRUIT AND THE LIKE
Filed Feb. 23, 1922 2 Sheets-Sheet 2
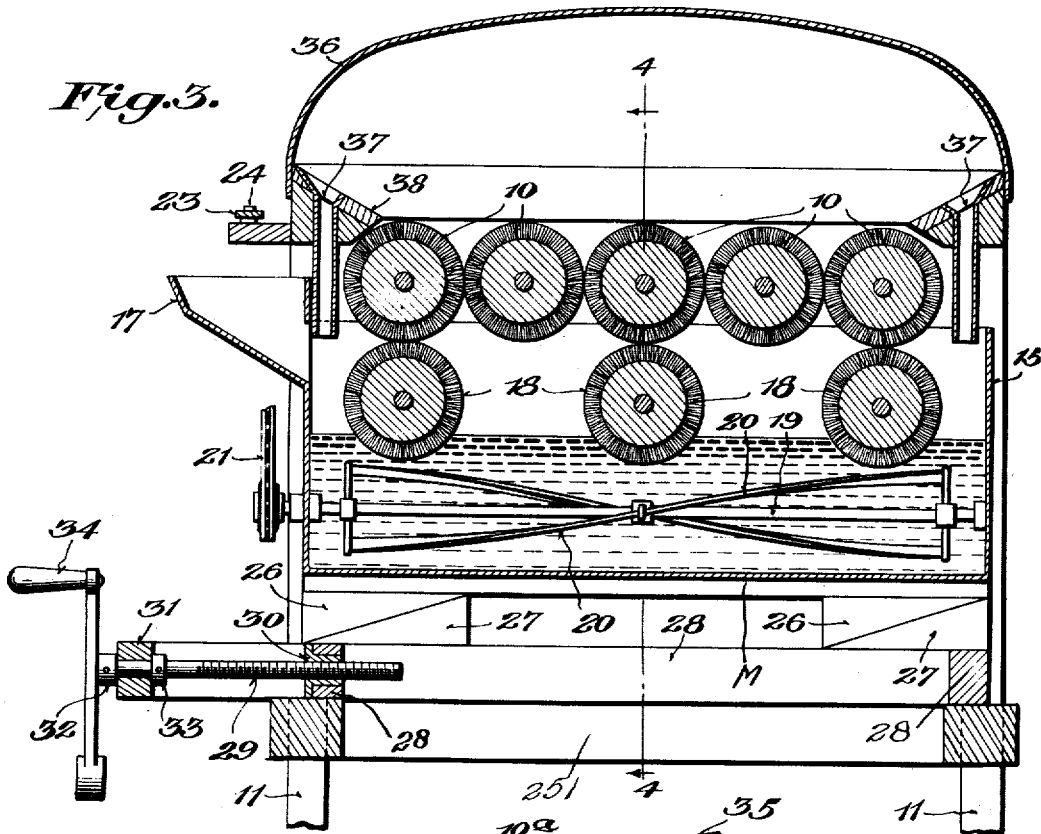
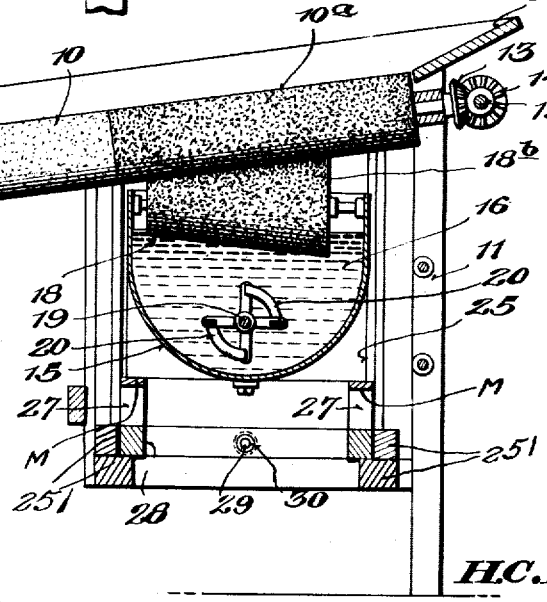
Inventor
H.C.Ricketts,
By Steward & McKay
his Attorneys Patented Feb. 19, 1924.

1,484,562

UNITED STATES PATENT OFFICE.

HOMER C. RICKETTS, OF WINTER HAVEN, FLORIDA, ASSIGNOR TO BROGDEN, RICKETTS & HAWORTH COMPANY, OF WINTER HAVEN, FLORIDA, A CORPORATION OF FLORIDA.

APPARATUS FOR TREATING FRUIT AND THE LIKE.

Application filed February 23, 1922. Serial No. 538,424.

*To all whom it may concern:*

Be it known that I, HOMER C. RICKETTS, a citizen of the United States, residing at Winter Haven, county of Polk, State of Florida, have invented certain new and useful Improvements in Apparatus for Treating Fruit and the like; and I do hereby declare the following to be a full, clear, and exact description of the invention, such as will enable others skilled in the art to which it appertains to make and use the same.

This invention relates to treatment of fruit and the like; and it comprises novel apparatus adapted for applying a protective or preservative material to fruit or the like.

The invention is concerned more particularly with the treatment of fruit, especially citrus fruit such as oranges, tangerines, grapefruit and lemons, with protective coating material effective, when properly applied, to preserve the fruit for a long time in its original fresh, sound and plump condition without withering or losing flavor, and to protect it against infection by mold or rot organisms. Compositions comprising a waxy material, such as paraffin, in mixture with a liquid vehicle, such as a petroleum distillate, have been found suitable for use in this connection. Mixtures of paraffin and gasoline, for example, have given satisfactory results. Compositions in which a liquid vehicle is employed in conjunction with paraffin are referred to here by way of example without intending thereby to limit the practice of the present invention to employment thereof. Apparatus embodying the broad principles of the invention and adapted especially for use with such a composition will, however, be more particularly described hereinafter as an example of one practical form which the novel apparatus may take.

Owing to the fact that, as commonly used in practice, protective coating compositions comprising paraffin or the like and a liquid vehicle are often in the form of semi-fluid mixtures that are not true solutions or even strictly homogeneous, there is sometimes a tendency for separation of semi-solid matter from the liquid vehicle to occur, which tendency becomes especially pronounced if the mixtures become chilled. Such separation sometimes renders it difficult to apply the compositions to fruit in such manner as to obtain uniform and dependable preservative coating effects. Moreover, this tendency of such compositions to separate or "clump" makes it necessary to apply to the fruit initially more than is normally required to produce the desired type of coating; and while this excess is usually removed to a great extent by the action of the rubbing or polisher apparatus employed in coating the fruit, the result is wasteful and uneconomical use of the composition.

I have found that the foregoing difficulties can be wholly or largely obviated if care is taken to have the coating composition in a homogeneous creamy condition at the moment of initial application to the fruit. This can be accomplished by thoroughly agitating the mixture and applying it immediately to the fruit without allowing time for separation or clumping to occur. Apparatus wherein provision is made to carry out this operation constitutes a part of this invention in an important specific embodiment thereof; but the invention comprises also other novel apparatus arrangements which, though most advantageously employed in association with the provision aforesaid, are not necessarily so employed in the broader aspects of the invention.

The invention will be best understood from a description of a typical concrete embodiment thereof exemplified in the apparatus shown in the accompanying drawings forming a part hereof, and from a description of how such apparatus may be used to treat fruit or the like in accordance with the invention.

Referring to the drawings,

Fig. 1 is a side elevation of apparatus constructed in accordance with my invention;

Fig. 2 is an end view of the same;

Fig. 3 is a transverse section on the line 3—3 of Fig. 1, parts being shown in elevation; and Fig. 4 is a longitudinal central section of a portion of the apparatus on the line 4—4 of Fig. 3, parts being shown in elevation.

In the construction chosen to illustrate the principles of the invention, the rubbing or polisher mechanism is of the inclined parallel brush-roll type. In the present instance, the inclined parallel brush rolls of this type of polisher are indicated generally at 10, being suitably journaled at their ends for rotation in bearings provided in the supporting framework here shown as comprising uprights 11, side members 111 extending longitudinally of the brush rolls and substantially parallel therewith, and crosspieces 112; said brush rolls being driven at the proper speed and in the same direction of rotation from driving shaft 12 by means of cooperating bevel gears 13, 14. The rotary brush rolls may be of the usual type in which the rubbing or brushing surfaces are constituted by horse-hair bristles, for example, said rolls cooperating in pairs to provide between each pair a trough-like runway for fruit sloping gently from the upper or receiving end of the polisher to the lower or discharge end. Although in the example here illustrated the rubbing or brush rolls slope somewhat, as described, they may properly be referred to as in a generally horizontal position, using this expression in a broad sense. Below the polisher rolls and adjacent the upper or receiving ends thereof is mounted a tank or reservoir 15, holding the fluid or semi-fluid coating and preserving composition 16, which in this instance is assumed to be the protective material to be applied to the fruit or the like and thoroughly rubbed over the surface thereof. In the present example, the tank or pan 15 extends transversely under the entire series of polisher rolls, and is provided at one end with an upwardly and outwardly extending hopper 17 through which coating composition may be supplied to the tank as may be necessary. Means are provided for transferring coating composition from the tank 15 to the polisher rolls 10; and in the arrangement here illustrated, such means comprises one or more applying rolls 18, which in the present example are also brush rolls though much shorter than the long rolls 10. Each of these brush rolls 18 is here shown located vertically below one of the rolls 10, and frictionally engaging the same in such manner as to be rotatable thereby. Each roll 18 is rotatably journaled at its opposite ends in bearings provided in the opposite walls of tank 15, and is arranged to dip into the coating composition contained in said tank. It is not essential that the rolls 18 be in vertical alinement with the respectively cooperating rolls 10, and it is evident that each of the rolls 18 may engage two adjacent rolls 10 since the latter are rotated in the same angular direction.

In practice it is found that the portion of each of the upper rolls 10 that engages a roll 18 may desirably have its brushing surface composed of stiffer bristles than horse-hair; and that the brushing surface of each of said rolls 18 also be composed of such stiffer bristles. This is because a more positive driving effect is thus obtainable on the applying rolls 18 than would be the case if the driving engagement were between horse-hair bristle surfaces. Accordingly, such stiffer bristle surfaces, such as fiber bristles for example, are indicated in Fig. 4 at $10^a$ on the upper roll, and at $18^b$ on the lower roll 18. In order that the bearings in which the lower or applying rolls 18 are journaled may be horizontally alined, it is desirable that each of the rolls 18 be coned as shown in Fig. 4 for engagement with the inclined cooperating upper rolls 10.

In order to maintain the coating composition thoroughly mixed, and also in order to maintain it of properly fluid consistency, the tank or reservoir 15 is provided with suitable agitating or stirring means. As before pointed out, this is especially desirable where the coating composition is, for example, a mixture of gasolene and paraffin in which the paraffin exists partly in solution and partly in suspension in such condition that there is some tendency for the mixture to separate to a greater or less extent upon standing or upon lowering of the temperature. For best results, a gasolene-paraffin mixture of this character should be kept thoroughly mixed, homogenized, or emulsified, and in a smooth creamy condition. Typical mixtures of this character are prepared by mixing gasolene with molten paraffin in proportions varying from say 20 parts of paraffin and 80 parts of gasolene for a comparatively thin mixture to say 60 parts of paraffin and 40 parts of gasolene for a thick mixture, all parts being by volume. The stirring means employed to accomplish this thorough mixing in accordance with the invention may take various forms, but a particularly desirable form is here illustrated, more particularly in Figs. 3 and 4, where a shaft 19 extends horizontally lengthwise of the tank 15 and is journaled for rotation in suitable bearings in the opposite end walls thereof, said shaft carrying a pair of helical blades 20, and being driven in any suitable manner, as through chain and sprocket mechanism indicated generally at 21. In this instance the chain and sprocket mechanism is adapted to be driven from the aforesaid shaft 12, to which said chain and sprocket mechanism can be connected, or from which it can be disconnected, by means of a suitable sliding sleeve toothed clutch 22, operable by a forked clutch lever 23, which clutch lever can be pivoted at 24 on the side of the machine framework as shown. This arrangement makes it possible to run the helical agitator device either intermittently or continuously during operation of the polisher rolls, and may be necessary to ensure maintaining the desired uniformity and consistency of the composition. In addition to serving as a mixer or agitator, the helical agitating and stirring device here shown offers special advantages because, when the device is in operation, it functions also as impeller means to establish and maintain a methodical circulation of the coating composition through the tank in such manner that fresh portions of the supply of coating composition are continually presented to the applying brushes 18 in the form of a stream or current flowing transversely to the axes thereof. It is of course also feasible to provide means for driving the agitator altogether independently of the polisher roll drive.

It is desirable to provide means for adjusting the position of the applying brushes 18 vertically with respect to the cooperating rolls 10 in order that the proper degree of engagement between each pair of rolls 18 and 10 may be attained and the preservative material controllably supplied to the brush rolls 10 in proper predeterminable quantity. In the construction here illustrated, this adjustability is attained by so mounting the tank or reservoir 15 that it, together with the parts mounted therein, can be raised or lowered bodily with respect to the rolls 10. Various means for accomplishing this end may be employed, but in the specific example here given, such adjustability is provided by means of inclined plane or wedge and screw mechanism. The side members M of the framework or cradle 25, by which the tank 15 is movably supported for vertical adjustment in framework F that is secured to the main frame 11 below the brush rolls are provided on their under sides with blocks 26 having inclined lower faces resting upon inclined faces of blocks 27, which latter are secured to a rectangular base frame 28 horizontally reciprocable in framework F transversely of the apparatus. Said reciprocable base frame 28 is carried by and bears upon transverse members 251 of framework F, which connect in pairs the uprights 252 of said framework, said uprights being secured to and depending from the longitudinal side members 111 of the main supporting framework, as shown. The framework F may also include suitable braces 253 connecting the uprights 252 with the uprights 11 of the main apparatus frame. The horizontal movement of the rectangular base frame to raise or lower the tank 15 may be effected, for example, by means of a screw 29 working in a threaded brushing 30 in a cross-member of frame 28, said screw being rotatable in a stationary member 31 rigid with the framework F, and being held against longitudinal movement by stop collars 32—33. The screw can be rotated by means of a handle 34 to move the frame 28 in either direction. It is apparent that the described arrangement including the container 15 and the applying roll or rolls 18 mounted therewith as a unit for up and down movement in the supporting and guiding frame F, constitutes broadly means for presenting coating material in adjustable contact with one or more of the polisher brush rolls for transfer of said material to the latter.

Employment of slow-motion adjusting means, such as screw-operated mechanism, especially where the same is readily accessible for manual operation as in the present example, enables an operator to control with accuracy the rate at which treating material is supplied to the brush rolls at all times without stopping the apparatus to make adjustments. This is an important factor in treating fruit with such material as paraffin which should be applied to the fruit in carefully predetermined and controllable amount. Where the rubbing or polishing apparatus comprises a plurality of fruit runways, as in the present example, application of substantially the same amount of paraffin to all the fruit, irrespective of which runway it rolls along in passing through the apparatus, is attained by an arrangement such as that here illustrated in which, as will be apparent, at least one rubbing roll of each runway-forming pair is supplied with treating material by means of a supplying device presenting such material directly thereto. By thus employing material-supplying means presenting treating material directly to a rubbing roll intermediate the outermost rolls of the series, as well as to such outermost rolls, accuracy of control and uniformity of treatment are much facilitated.

In using the apparatus for coating fruit, the fruit is fed to the upper end of the machine over chute board 35 and passes gradually down the sloping runways formed by the cooperating pairs of inclined parallel polisher rolls, the rate at which the fruit travels down the runways being dependent upon the rate at which said rolls are rotated. At the same time, the applying rolls 18 are also rotated by frictional engagement with the rolls 10 with which they respectively cooperate, the coating composition 16 being thus transferred by the rolls 18 to rolls 10 at or adjacent their upper ends, and thence to the fruit just as it enters the runways between the polisher rolls. In this way each fruit has a small quantity of the coating composition initially applied to it; and as the fruit progresses down the polisher runways, the composition is uniformly spread in a very thin coating or film all over the surface of the fruit by the rubbing action of the brush rolls. Said rolls may be formed, as by spiral grooving or ribbing (not shown), to favor rotation of the fruit about several different axes. The composition is thus thoroughly rubbed and distributed over the fruit, and upon evaporation of all or most of the volatile solvent, gasolene in a typical instance, there remains an adherent film coating of paraffin on the fruit which effectively seals the surface thereof in the desired manner. During the described operation, the helical agitator device before described may also be rotated to keep the coating mixture at the creamy and readily fluid consistency best adapted to produce a preservative coating of dependable uniformity. It will be noted that the mixture is transferred immediately to the fruit without having any chance to separate or clump.

The polisher brushes, especially when rotated at fairly high speed, tend to throw off some of the coating composition; and it is therefore desirable in some instances to provide a hood or cover 36 over the polisher rolls to catch such throw-off. This hood may serve also to confine the vapors of the volatile solvent, if such solvent is used and permit of their being led away through an exhaust duct or the like (not shown) for discharge to any convenient point. Drain channels or ducts 37 extending through the side boards 38 downwardly into the upper part of the tank 15 may be provided to return to the tank any of the coating composition or condensed solvent caught by the hood and flowing down upon the side boards 38.

While the specific apparatus hereinabove described has been found to offer important advantages in the practice of the invention, it is to be understood as illustrative and not restrictive. It is also to be understood that reference herein to fruit is to be construed broadly as including not only fruit strictly but also such vegetables as can advantageously be treated in the manner described.

The process described herein forms the subject-matter of a divisional application Serial No. 631,807, filed April 13, 1923.

What I claim is:

1. Apparatus for treating fruit comprising the combination, with a rotary roll polisher having a runway through which fruit may pass, of a supply reservoir for coating material, and a rotary device arranged to transfer coating material from said reservoir to a roll of said polisher, said rotary device extending less than the entire length of said roll from a point adjacent where fruit enters said runway.

2. Apparatus for treating fruit comprising the combination, with a plurality of rotary brush rolls mounted in parallel to provide one or more fruit runways, of a container for coating material, and a roll device relatively short as compared to said brush rolls and arranged to transfer coating material from said container to at least one of said brush rolls adjacent where fruit enters said runway.

3. Apparatus for treating fruit comprising the combination, with a plurality of rotary brush rolls mounted in parallel to provide one or more fruit runways, of a container for coating material located below said rolls, and an adjustably mounted roll extending into said container and frictionally driven by one of said brush rolls.

4. Apparatus for treating fruit comprising the combination, with brush roll mechanism providing a fruit runway, of a container for coating material located therebelow, and applying roll means extending into said container and engaging said brush roll mechanism along less than the entire length of said runway from a point adjacent where the fruit enters the same.

5. Apparatus for treating fruit comprising the combination with rotary rubbing means providing a fruit runway and means for directing fruit thereto, of means for applying a fluid or semi-fluid coating material to said rotary rubbing means along only a portion thereof extending from a point adjacent where fruit enters the apparatus.

6. Apparatus for treating fruit comprising the combination, with inclined brush rolls cooperating to provide an inclined polisher runway, of means arranged to apply a spreadable coating material thereto along only a portion thereof extending from a point adjacent where fruit enters said runway.

7. Apparatus for treating fruit or the like comprising the combination with a plurality of rotary rubbing rolls mounted in parallel to provide one or more fruit runways, and driving means therefor, of a container mounted below said rolls, a rotary applying roll substantially shorter than said rubbing rolls mounted therebelow with its axis substantially parallel with the axes of said rubbing rolls, said applying roll extending into said container and arranged to engage at least one of said rubbing rolls.

8. Apparatus as set forth in claim 7, in which said applying roll is frictionally driven by its engagement with a rubbing roll, and further comprising means for adjusting the degree of such engagement.

9. Apparatus as set forth in claim 7, further comprising agitator and impeller means arranged and adapted to circulate fluid material within said container in a current flowing transversely into contact with said applying roll.

10. Apparatus as set forth in claim 8, in which that portion of the rubbing roll engaged by said applying roll is provided with a surface of greater frictional properties than the remainder of said rubbing roll.

11. Apparatus as set forth in claim 8, in which said rubbing rolls and said applying roll are provided with brush surfaces, the brush surfaces of said applying roll and that portion of the rubbing roll engaged thereby being stiffer than the rest.

12. Apparatus for treating fruit comprising a plurality of parallel inclined rotary rubbing rolls cooperating to provide fruit runway means, a tank disposed below said rubbing rolls, and an applying roll extending into said tank and engaging one of said rubbing rolls, and an agitating device in said tank.

13. Apparatus for treating fruit comprising the combination, with rotary rubbing means, and driving mechanism therefor, of a supply reservoir for coating composition operatively adjacent said rubbing means, an agitator in said reservoir, and means, including a shiftable clutch device, for transmitting power from said driving mechanism to said agitator.

14. Apparatus for treating fruit comprising the combination, with polisher brush rolls cooperating to provide a polisher runway through which fruit may pass, of means mounted operatively adjacent said rolls for presenting thereto material to be spread upon fruit, said means being adjustable toward and away from said rolls, and slow-motion adjusting means for effecting adjusting movement of such presenting means.

15. Apparatus for treating fruit comprising the combination, with inclined polisher brush rolls cooperating to provide an inclined polisher runway extending longitudinally thereof, of means for presenting coating material in contact with said brush rolls for transfer thereto, and screw-actuated adjusting means operable to effect slow-motion adjustment of the relative positions of said brush rolls and such presenting means to regulate the degree of such contact.

16. Apparatus for treating fruit comprising the combination, with inclined polisher brush rolls cooperating to provide an inclined polisher runway extending longitudinally thereof, and means for driving said rolls in the same direction of rotation, of means supported below said brush rolls and extending from near their upper ends less than the entire distance to their lower ends for supplying coating material thereto, and adjusting means operable to raise and lower such supplying means with respect to said brush rolls.

17. Apparatus for treating fruit comprising the combination, with inclined polisher brush rolls cooperating to provide an inclined polisher runway extending longitudinally thereof, of a framework disposed therebelow, means, including a container, mounted for substantially vertical adjusting movement within said framework for applying coating material to said brush rolls, and adjusting means operable to raise and lower such applying means within said framework.

18. Apparatus for treating fruit comprising the combination, with brush roll mechanism providing a fruit runway, of a container for coating material adjustably mounted therebelow, applying roll means supported by and extending into said container and engaging said brush roll mechanism, and means for bodily adjusting said container toward and from said brush roll mechanism.

19. Apparatus for treating fruit comprising the combination, with brush roll mechanism providing a fruit runway, of a container for coating material adjustably mounted therebelow, applying roll means extending into said container and engaging said brush roll mechanism, and means for bodily adjusting said container toward and from said brush roll mechanism, said means comprising an element presenting an inclined plane and a raising and lowering element screw adjusted along said inclined plane.

20. Apparatus as set forth in claim 17, in which said adjusting means comprises a plurality of adjustable supporting devices for said container and means for actuating said devices simultaneously to raise or lower said container.

21. Apparatus as set forth in claim 17, in which said adjusting means comprises a plurality of inclined plane supporting devices arranged below said container, and screw-operated means for actuating said devices simultaneously to raise or lower said container.

22. Apparatus for treating fruit comprising the combination, with a plurality of polisher brush rolls arranged side by side in a generally horizontal position and cooperating to provide trough-like runway means along which fruit may pass, and a supporting frame upon which said brush rolls are mounted for rotation, said supporting frame including members disposed on opposite sides of said plurality of brush rolls and extending longitudinally thereof and substantially parallel therewith, of supplemental frame means disposed below said brush rolls and including a plurality of uprights attached to such longitudinally extending members of the supporting frame and extending downward therefrom and transverse members connecting said uprights, an adjustable treating material carrier supported by said supplemental frame and guided by said uprights for up-and-down adjusting movement to effect proper presentation of the treating material to said brush rolls, and means for effecting such adjusting movement of said carrier.

23. Apparatus for treating fruit comprising the combination, with a plurality of elongated brush rolls arranged side by side in a generally horizontal position and cooperating to provide trough-like runway means along which fruit may pass, and a supporting frame upon which said brush rolls are mounted for rotation, said supporting frame including longitudinal side members extending along the opposite sides of said plurality of brush rolls and substantially parallel thereto, of supporting means depending from each of said longitudinal side members, treating material carrier means supported thereby below and operatively adjacent to said brush rolls, and adjusting means cooperating with such depending supporting means to adjust the position of said carrier means vertically with respect to the under side of said brush rolls.

24. Apparatus for treating fruit comprising the combination, with a plurality of elongated brush rolls arranged side by side in a generally horizontal position and cooperating to provide trough-like runway means along which fruit may pass, and a supporting frame upon which said brush rolls are mounted for rotation, said supporting frame including longitudinal side members extending along the opposite sides of said plurality of brush rolls and substantially parallel thereto, of supplemental supporting means comprising members extending downwardly from each of said longitudinal side members and transverse members extending underneath said brush rolls and connecting said supplemental supporting members in pairs, and carrier means supported by said transverse members for carrying treating material and presenting same to the under side of said brush rolls.

25. Apparatus for treating fruit comprising a series of rubbing rolls rotatably mounted side by side and cooperating in pairs to provide a plurality of parallel fruit runways, driving means for said rolls, and means for supplying treating material directly to the under side of a roll of each runway-forming pair.

26. Apparatus for treating fruit comprising a series of rubbing rolls rotatably mounted side by side in a generally horizontal position, and cooperating in pairs to provide a plurality of parallel fruit runways, and means for driving said rolls in the same direction of rotation, in combination with material-supplying means located underneath said rolls and arranged to present treating material against a plurality of the rolls of said series including a roll intermediate the outermost rolls of the series.

27. Apparatus for treating fruit comprising a series of rubbing rolls rotatably mounted in a generally horizontal position, and cooperating in pairs to provide a plurality of parallel fruit runways, and means for driving said rolls in the same direction of rotation, in combination with material-supplying means located underneath said rolls and arranged to present treating material against a plurality of the rolls of said series including a roll intermediate the outermost rolls of the series, and mechanism manually operable to control the rate at which the treating material is supplied to the rolls by such supplying means.

28. Apparatus for treating fruit comprising a series of rubbing rolls rotatably mounted side by side in a generally horizontal position and cooperating in pairs to provide a plurality of parallel fruit runways, and driving means for said rolls, of a plurality of devices located below said rolls for supplying treating material to the under surface thereof, at least one roll of each runway-forming pair being supplied with treating material presented directly thereagainst by one of said devices.

29. Apparatus for treating fruit comprising a series of rubbing rolls rotatably mounted side by side in a generally horizontal position and cooperating in pairs to provide a plurality of parallel fruit runways, and driving means for said rolls, of a plurality of devices located below said rolls for supplying treating material to the under surface thereof, at least one roll of each runway-forming pair being supplied with treating material presented directly thereagainst by one of said devices, and means whereby all of said devices may be raised or lowered to control the rate at which treating material is supplied to said rolls.

In testimony whereof I hereunto affix my signature.

HOMER C. RICKETTS.

Certificate of Correction.

It is hereby certified that Letters Patent No. 1,484,562, granted February 19, 1924, upon the application of Homer C. Ricketts, of Winter Haven, Florida, for an improvement in "Apparatus for Treating Fruit and the Like," were erroneously issued to "Brogden, Ricketts & Haworth Company, of Winter Haven, Florida, a Corporation of Florida," whereas said Letters Patent should have been issued to *Brogdex Company, of Winter Haven, Florida, a Corporation of Florida*, as assignee, by *mesne assignments*, of the entire interest in said invention, as shown by the records of assignments in this Office; and that the said Letters Patent should be read with this correction therein that the same may conform to the record of the case in the Patent Office.

Signed and sealed this 15th day of July, A. D. 1924.

[SEAL.]

THOMAS E. ROBERTSON,
*Commissioner of Patents.*